United States Patent [19]

Ishikawa

[11] Patent Number: 5,719,712

[45] Date of Patent: Feb. 17, 1998

[54] CLICKING DEVICE HAVING A ROTARY MEMBER WITH TEETH ENGAGEABLE WITH A PLURALITY OF FIXED PROJECTIONS

[75] Inventor: Yasuaki Ishikawa, Sagamihara, Japan

[73] Assignee: Nikon Corporation, Tokyo, Japan

[21] Appl. No.: 735,743

[22] Filed: Oct. 23, 1996

[30] Foreign Application Priority Data

Dec. 22, 1995 [JP] Japan ..................... 7-335084

[51] Int. Cl.⁶ .............................................. G02B 07/02
[52] U.S. Cl. ............................... 359/819; 359/819
[58] Field of Search ........................... 359/819, 818, 359/809, 811, 822

[56] References Cited

U.S. PATENT DOCUMENTS

| | | | |
|---|---|---|---|
| 3,893,135 | 7/1975 | Matsui et al. | 354/167 |
| 4,637,563 | 1/1987 | Arii et al. | 242/4 B |
| 5,009,629 | 4/1991 | Tagawa | 474/80 |
| 5,165,117 | 11/1992 | Kamata | 2/424 |
| 5,185,889 | 2/1993 | Kamata | 2/424 |
| 5,186,072 | 2/1993 | Nagano | 74/501.5 |
| 5,325,140 | 6/1994 | Torikoshi et al. | 354/159 |
| 5,327,292 | 7/1994 | Eguchi | 359/827 |

*Primary Examiner*—David C. Nelms
*Assistant Examiner*—Ricky Mack

[57] ABSTRACT

There is provided a click device adapted to define a position by fitting a clicking projection in desired one of clicking grooves provided at a predetermined pitch. For defining the position with a unit less than a pitch of the clicking grooves, there are provided plural clicking projections, which are provided in respectively different positions within a pitch (or N pitches, wherein N is zero or a natural number) of the clicking grooves.

12 Claims, 2 Drawing Sheets

1

CLICKING DEVICE HAVING A ROTARY MEMBER WITH TEETH ENGAGEABLE WITH A PLURALITY OF FIXED PROJECTIONS

BACKGROUND OF THE INVENTION

1. Field of the Invention

The present invention relates to a click device, adapted for use for example in a visibility adjusting ring of a binocular.

2. Related Background Art

The adjustment of visibility of the binocular is generally conducted by rotating a visibility adjusting ring.

The visibility adjusting ring is rotatably provided on the external periphery of an eyepiece lens barrel of the binocular. An eyepiece lens ring integral with the visibility adjusting ring is fitted on the internal periphery of the eyepiece lens barrel, and engages with a female screw provided in a part of the internal periphery of the eyepiece lens barrel. The eyepiece lens ring supports an eyepiece lens, and the visibility adjusting ring is provided, on the external periphery thereof, with a knurl for avoiding slippage of a finger. By the rotation of the visibility adjusting ring, the eyepiece lens ring rotates therewith and moves in the direction of the optical axis, thereby effecting adjustment matching the visibility of the user. In such a visibility adjusting mechanism, a click device is provided in order to avoid unexpected movement of the visibility adjusting ring.

The click device is composed of clicking grooves formed at a constant pitch in the circumferential direction, on the external periphery of the eyepiece lens barrel, and a click projection member integrally provided on the internal periphery, opposed to the clicking grooves, of the visibility adjusting ring and adapted to elastically press a click projection against the clicking grooves.

Thus, in the course of rotation of the visibility adjusting ring, the clicking projection rides across a projecting portion between the clicking grooves and falls into the immediately adjacent groove. In this manner the position of the visibility adjusting ring can be fixed, by a minimum unit defined by the pitch of the clicking grooves.

In such conventional technology, the change in the position can be defined in a smaller angular unit by reducing the pitch of the clicking grooves, but such reduction in the pitch of the clicking grooves has certain limits, in consideration, for example, of the manufacturing cost.

SUMMARY OF THE INVENTION

The object of the present invention is to provide a click device capable of defining position with a unit smaller than the pitch of the clicking grooves.

In a click device for defining position by fitting a clicking projection in a desired one of clicking grooves formed with a constant pitch, according to the present invention there are provided plural clicking projections which are respective provided in different positions within a pitch (or N pitches, wherein N is zero or a natural number) of the clicking grooves, whereby the position can be defined with a resolving power less than a pitch. The fitting of the clicking projection may be achieved by elastic pressing thereof against the clicking groove, or by forming the clicking projection in such a manner that the clicking projection is normally in a position fitting into the click groove and is elastically displacelable by an external force so as to ride on the projecting portion between the clicking grooves when the clicking projection gets out of the clicking groove.

In case the click device is provided with M clicking projections, the positions of such clicking projections are preferably displaced in succession by 1/M of the aforementioned pitch, within a pitch (or N pitches, wherein N is zero or a natural number). Such configuration allows to define the position with a unit of 1/M of the pitch.

DESCRIPTION OF THE PREFERRED EMBODIMENTS

Figure 1:
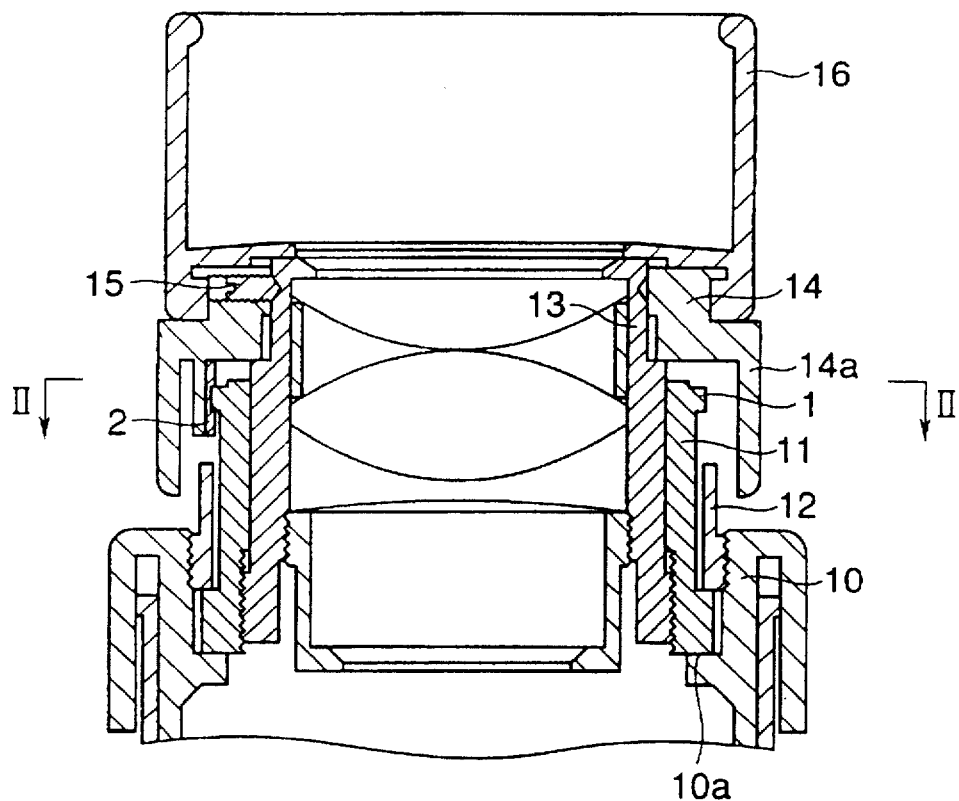
FIG. 1 is a partial cross-sectional view of an eyepiece portion of a binocular, in which a first embodiment of the present invention is applied.
Figure 2:
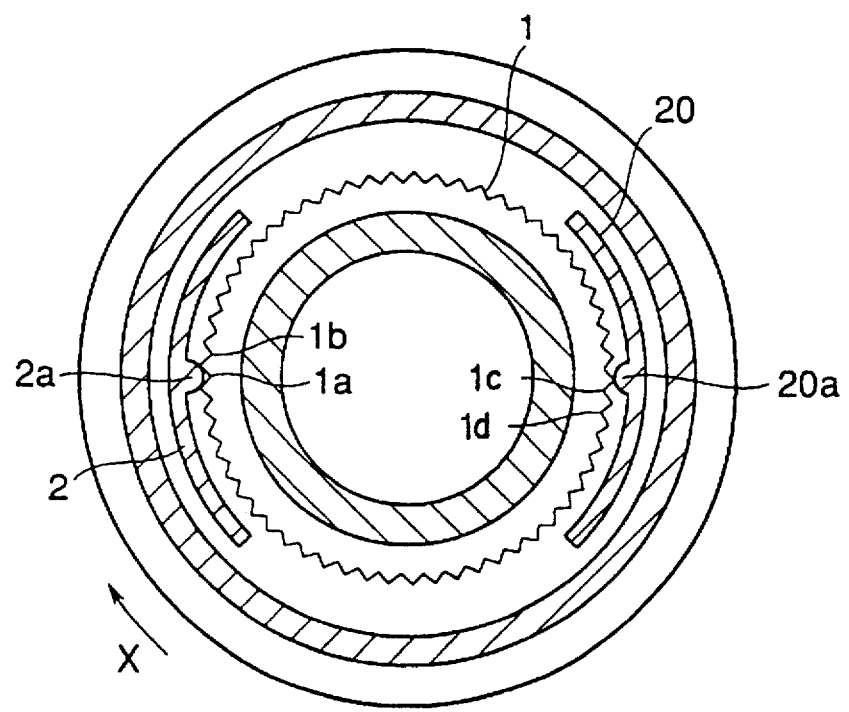
FIG. 2 is a cross-sectional view of the first embodiment of the present invention, along a line II—II in FIG. 1.
Figure 3:
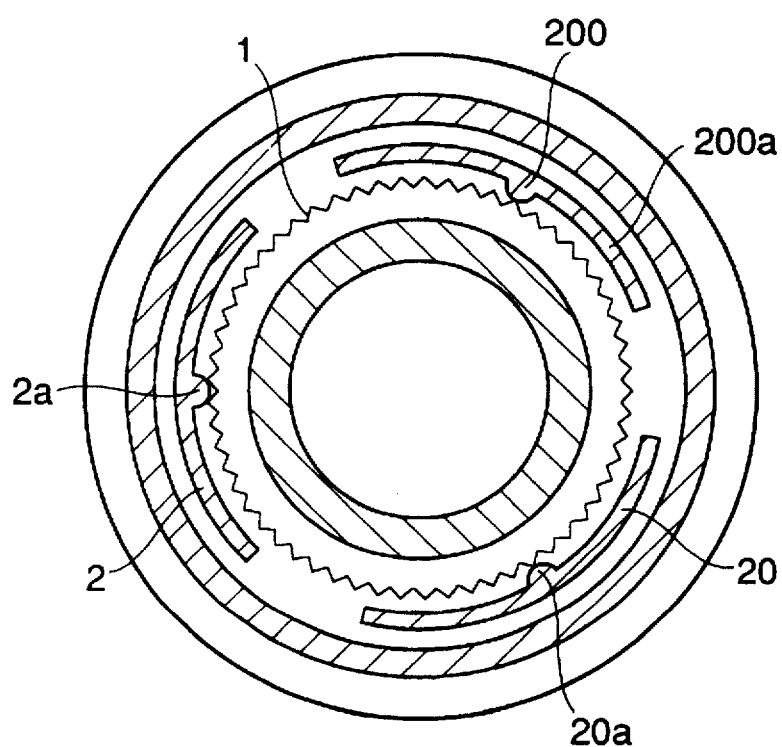
FIG. 3 is a cross-sectional view, similar to FIG. 2, of a second embodiment of the present invention.

FIG. 1 is a cross-sectional view of an eyepiece portion of a binocular, in which a click device embodying the present invention is applied for defining the position of the visibility adjusting ring, and FIG. 2 is a cross-sectional view showing the principle of the click device, along a line II—II in FIG. 1, and FIG. 3 is a view showing another embodiment.

On an annular base 10a formed on the internal periphery of a binocular body 10, there is placed an eyepiece lens barrel 11, which is integrally fixed with the binocular body 10 by means of a stop ring 12. On the internal periphery of the eyepiece lens barrel 11, there is fitted an eyepiece lens ring 13, which supports an eyepiece lens and is provided on the external periphery thereof with a male screw engaging with a female screw formed on the internal periphery of the eyepiece lens barrel 11. A visibility adjusting ring 14, provided with an operating portion 14a having an internal diameter larger than the external diameter of the eyepiece lens barrel 11 and formed so as to cover the outside of the eyepiece lens barrel 11, bridges over the upper end of the eyepiece lens barrel 11 and is fixed to the eyepiece lens ring 13 in the vicinity of the upper end thereof, by means of a fixing screw 15. At the upper end of the visibility adjusting ring 14 there is fitted a rubber eye cup 16.

The external periphery of the eyepiece lens barrel 11 is provided, in the vicinity of the upper end thereof, with clicking grooves 1a, 1b, . . . , over the entire circumference to constitute a clicking groove array 1, and, in a position opposed thereto, the visibility adjusting ring 14 is provided with a clicking projection member 2 having a projection so as to fit into the clicking groove 1a. The clicking projection member 2 is composed of an arc-shaped thin plate member on which a projection is so formed as to fit into the clicking groove 1a, and the arc-shaped thin plate member itself has elasticity in a direction perpendicular to the direction of the array of the clicking grooves of the groove array 1. As shown in FIG. 2, there are provided two clicking projection members 2, 20 in approximately opposite positions, wherein the positions of the projections of the clicking projection members 2, 20 are mutually displaced by ½ of the pitch of the clicking grooves of the groove array 1.

In such configuration, with the rotation of the visibility adjusting ring 14 in a direction X, the eyepiece lens ring 13 also rotates and moves in the axial direction of the lens, and, in the course of such rotation, the projections 2a, 20a of the clicking projection members 2, 20 fit in succession in the clicking grooves of the groove array 1. When the visibility adjusting ring 14 is rotated from a state where the projection 2a of the clicking projection member 2 engages with the clicking groove 1a, the projection 20a of the clicking projection member 20 fits into a clicking groove 1c, before the projection 2a of the clicking projection member 2 fits in a clicking groove 1b, next to the currently engaging groove 1a. When the visibility adjusting ring 14 is rotated further, the projection 2a of the clicking projection member 2 fits in a clicking groove 1b before the projection 20a of the clicking projection member 20 fits into a clicking groove 1d next to the currently engaging groove 1c.

In this manner the projections 2a, 20a of the clicking projection members 2, 20 alternately fit into the grooves of the groove array 1, whereby obtained is a click device capable of defining the position with a unit of ½ of the pitch of the grooves in the clicking groove array 1.

In FIG. 3 which is a cross-sectional view similar to that shown in FIG. 2, there is shown a configuration provided with three clicking projection members 2, 20, 200 of which clicking projections 2a, 20a, 200a are mutually displaced by ⅓ of the pitch of the clicking grooves of the groove array 1, whereby the position can be defined with a unit of ⅓ of the above-mentioned pitch.

As will be apparent from the foregoing description, it is possible to define the position with a unit of 1/M of the pitch of the clicking grooves, by providing M clicking projections and displacing the positions of such M clicking projections respectively by 1/M of the pitch of the clicking grooves. Also, since each projection may be positioned corresponding to any of the clicking grooves in the groove array, it will be apparent that such projections may be mutually displaced by N pitches (N being zero or an arbitrary natural number). The clicking grooves have a pitch Pb, the projections have a pitch Pa, and the following relationship holds true, $Pa = Pb \cdot N + 1/M$ where N is an integer $\geq 1$.

In the foregoing embodiments, the projections of the clicking projection members are mutually distanced equally, but the mutual distances of such projections need not necessarily be equal, depending on the convenience of use. Also in the foregoing embodiments, the clicking groove array is formed in the circumferential direction, since the present invention is applied to the visibility adjusting ring of the binocular, but the click device of the present invention is applicable to other various equipment. As an example, the present invention may be applied to a linearly moving device having a clicking groove array on a flat plate.

Also the details of the click device are subject to various modifications. As an example, the clicking projection member may be composed of a spring plate, elastically biased in a direction perpendicular to the direction of array of the grooves of the clicking groove array.

As explained in the foregoing, the present invention provides a click device capable of defining the position with a unit smaller than the pitch of the grooves of the clicking groove array. Particularly, by arranging the plural projections of the clicking projection member with a constant pitch, the positions can be defined with such constant pitch.

What is claimed is:

1. A click device comprising:

plural recesses arranged with a constant pitch; and plural projections each of which is movable between an engaging position engaging with one of said recesses and a disengaged position released from any of said recesses, wherein a relative movement between said recesses and said projections requires a predetermined force in case any of said projections is in said engaged position but requires a force smaller than said predetermined force in case all said projections are in said disengaged position;

wherein the pitch of said projections is different from the pitch of said recesses or a multiple thereof.

2. A click device according to claim 1, wherein the number (M) of said projections, the pitch (Pa) of said projections and the pitch (Pb) of said recesses satisfy a relation:

$$Pa = Pb \cdot N + 1/M$$

wherein N is an integer at least equal to 1.

3. A click device according to claim 2, wherein the number of said projections is 2.

4. A click device according to claim 2, wherein the number of said projections is 3.

5. A click device according to claim 1, further comprising an elastic member for pressing said projections toward said recesses.

6. A click device according to claim 1, wherein said recesses are arranged along the circumferential direction.

7. A click device according to claim 1, provided on a visibility adjusting ring of a binocular.

8. A click device comprising:

a rotary member having a plurality of teeth formed around an outer periphery thereof, with the teeth being formed around substantially all of the periphery of the rotary member;

a plurality of projections to engage with spaces formed between the teeth, wherein said projections are formed to face said teeth and are fixedly mounted so as not to move with the rotary member; and said rotary member is able to rotate 360°.

9. A click device in combination with binoculars, comprising:

the binoculars;

a rotary member having a plurality of teeth formed around an outer periphery thereof, with the teeth being formed around substantially all of the periphery of the rotary member, the rotary member being rotatably fixed to said binoculars for use as a visibility adjusting ring;

a plurality of projections to engage with spaces formed between the teeth, said projections being fixed to said binoculars.

10. A clicking device in combination with binoculars as claimed in claim 9, wherein the following relationship is satisfied:

$$Pa = Pb \cdot N + 1/M$$

where Pa is the pitch of the projections, Pb is the pitch of the spaces between the teeth, M is the number of projections and N is an integer greater than or equal to 1.

11. A clicking device in combination with binoculars as claimed in claim 9, wherein the projections are formed at a 180° interval.

12. A clicking device in combination with binoculars as claimed in claim 9, wherein the projections are formed at 120° intervals.

* * * * *